United States Patent
Takeda

(10) Patent No.: US 12,306,401 B2
(45) Date of Patent: May 20, 2025

(54) DISPLAY MODULE HAVING LIGHT-SHIELDING PORTIONS WITH APERTURES HAVING DIFFERENT SHAPES, VIRTUAL DISPLAY APPARATUS, AND MANUFACTURING METHOD FOR LIGHT-GUIDING OPTICAL DEVICE

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 636 days.

(21) Appl. No.: 17/534,410

(22) Filed: Nov. 23, 2021

(65) Prior Publication Data
US 2022/0163805 A1 May 26, 2022

(30) Foreign Application Priority Data
Nov. 25, 2020 (JP) .................. 2020-195321

(51) Int. Cl.
*G02B 27/01* (2006.01)
*B29D 11/00* (2006.01)

(52) U.S. Cl.
CPC .... *G02B 27/0172* (2013.01); *B29D 11/00692* (2013.01); *B29D 11/00875* (2013.01); *G02B 2027/013* (2013.01); *G02B 2027/0178* (2013.01)

(58) Field of Classification Search
CPC .............. G02B 27/017; G02B 27/0172; G02B 2027/0178
See application file for complete search history.

(56) References Cited

U.S. PATENT DOCUMENTS

| 5,703,605 | A | * | 12/1997 | Takahashi | .......... | G02B 27/0172 |
|---|---|---|---|---|---|---|
| | | | | | | 359/630 |
| 5,768,025 | A | * | 6/1998 | Togino | .................... | G02B 17/08 |
| | | | | | | 359/633 |
| 5,838,504 | A | * | 11/1998 | Ichikawa | ............... | G03B 13/06 |
| | | | | | | 359/834 |
| 6,084,715 | A | * | 7/2000 | Aoki | .................... | G02B 23/243 |
| | | | | | | 359/627 |
| 6,124,977 | A | * | 9/2000 | Takahashi | .......... | G02B 27/0172 |
| | | | | | | 359/636 |

(Continued)

FOREIGN PATENT DOCUMENTS

| JP | 2013025102 | 2/2013 |
|---|---|---|
| JP | 2016090910 | 5/2016 |

*Primary Examiner* — Bao-Luan Q Le
(74) *Attorney, Agent, or Firm* — JCIPRNET

(57) ABSTRACT

Provided is a display module including a display element, and a light-guiding optical device that guides image light emitted from the display element to form an exit pupil, in which the light-guiding optical device is an off-axis optical system. The off-axis optical system includes a first optical surface, a second optical surface, a first light-shielding portion, the first light-shielding portion being formed at the first optical surface, and a second light-shielding portion, the second light-shielding portion being formed at the second optical surface, in which the first light-shielding portion exposes, through a first aperture, a part of the first optical surface, and the second light-shielding portion exposes, through a second aperture, a part of the second optical surface, the first aperture and the second aperture having mutually different shapes.

11 Claims, 11 Drawing Sheets

(56) References Cited

U.S. PATENT DOCUMENTS

| | | | |
|---|---|---|---|
| 6,201,646 B1* | 3/2001 | Togino | G02B 17/0848 |
| | | | 359/629 |
| 6,222,676 B1* | 4/2001 | Togino | G02B 27/0172 |
| | | | 359/676 |
| 6,310,736 B1* | 10/2001 | Togino | G02B 27/0172 |
| | | | 359/834 |
| 6,573,952 B1* | 6/2003 | Yamazaki | G02B 27/017 |
| | | | 351/158 |
| 7,285,319 B1* | 10/2007 | Steiner | B05D 5/06 |
| | | | 428/209 |
| 2003/0123706 A1* | 7/2003 | Stam | B60Q 1/2603 |
| | | | 382/104 |
| 2016/0131909 A1 | 5/2016 | Nakamura et al. | |
| 2018/0045964 A1* | 2/2018 | Jones | G02B 27/0172 |
| 2022/0163706 A1* | 5/2022 | Feldman | G02B 13/0065 |

* cited by examiner

DISPLAY MODULE HAVING LIGHT-SHIELDING PORTIONS WITH APERTURES HAVING DIFFERENT SHAPES, VIRTUAL DISPLAY APPARATUS, AND MANUFACTURING METHOD FOR LIGHT-GUIDING OPTICAL DEVICE

The present application is based on, and claims priority from JP Application Serial Number 2020-195321, filed Nov. 25, 2020, the disclosure of which is hereby incorporated by reference herein in its entirety.

BACKGROUND

1. Technical Field

The present disclosure relates to a display module, a virtual image display apparatus, and a manufacturing method for a light-guiding optical device.

2. Related Art

In JP 2016-90910 A, there is disclosed a head-mounted display that provides an aperture restriction means at an incidence surface of a prism member constituting an optical system to remove unnecessary light.

In JP 2016-90910 A, the aperture restriction means is used in the optical system having axial symmetry, thus the aperture restriction means has an axially symmetrical aperture shape.

In an optical system that does not have axial symmetry, a difference occurs in the luminous flux widths of image light at a location where the principal light rays of the image light superimpose with one another. Accordingly, when the aperture restriction means of JP 2016-90910 A is used in the optical system that does not have axial symmetry, light that is to be blocked as the unnecessary light partially passes through an aperture having an axially symmetrical shape, which makes it difficult to sufficiently remove the unnecessary light, for example.

SUMMARY

According to one aspect of the present disclosure, there is provided a display element that emits an image light, a light-guiding optical device that includes: a first optical surface in which the image light from the display element is incident, a second optical surface emitting the image light, a first light-shielding portion provided along the first optical surface and including a first aperture, and a second light-shielding portion provided along the second optical surface and including a second aperture. a shape of the first aperture is different from a shape of the second aperture.

According to one aspect of the present disclosure, a virtual image display apparatus including the display module of the above-described aspect is provided.

According to one aspect of the present disclosure, there is provided a manufacturing method for a light-guiding optical device that guides image light emitted from a display element to form an exit pupil, the method including a mask forming step for forming a mask at a part on an optical surface of an optical member, a light-shielding portion forming step for forming a light-shielding portion in an area, in the optical surface of the optical member, where the mask is not formed, and a mask removal step for removing the mask from the optical member where the light-shielding portion is formed, in which the mask forming step includes an application step for positioning a mask forming member on the optical surface using a support member supporting the optical member and then applying a mask formation material onto the mask forming member, and a removal step for removing the mask forming member from the optical surface to form the mask at a position corresponding to an aperture portion of the mask forming member.

According to one aspect of the present disclosure, there is provided a manufacturing method for a light-guiding optical device that guides image light emitted from a display element to form an exit pupil, the method including a covering step for disposing a cover member onto an optical surface of an optical member to cover a part of the optical surface, a light-shielding step for forming a light-shielding portion in a predetermined area in the optical surface of the optical member, and a removal step for removing the cover member from the optical member forming the light-shielding portion, in which the covering step includes using, as the cover member, a member including a frame-shaped base portion, a cover portion located inside the base portion, the cover portion covering the optical surface, and a coupling portion coupling the base portion with the cover portion, in a state where a gap is created with respect to the optical surface, and the light-shielding step includes positioning the cover member on the optical surface using a support member supporting the optical member, and then forming a light-shielding coating film onto the predetermined area, in the optical surface, that is not covered by the cover member to form the light-shielding portion.

DESCRIPTION OF EXEMPLARY EMBODIMENTS

First Embodiment

An embodiment of the present disclosure is described below with reference to the accompanying drawings. Note that, in the following drawings, the measure and angle of each member are different from the actual measure and angle in order to make the size of each member substantially recognizable.

Figure 1:
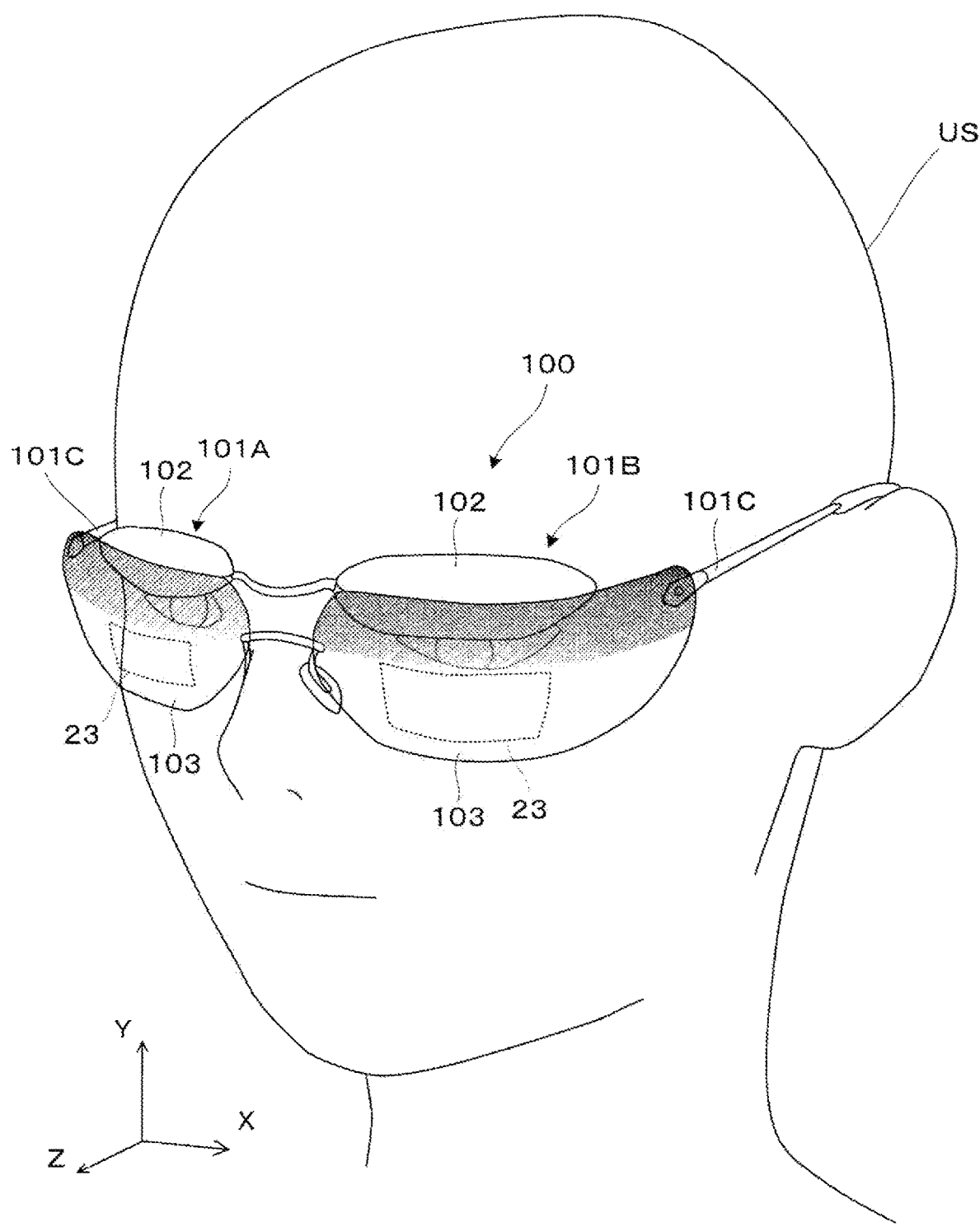
FIG. 1 is an external perspective view illustrating a state of wearing a virtual image display apparatus of the first embodiment.
Figure 2:
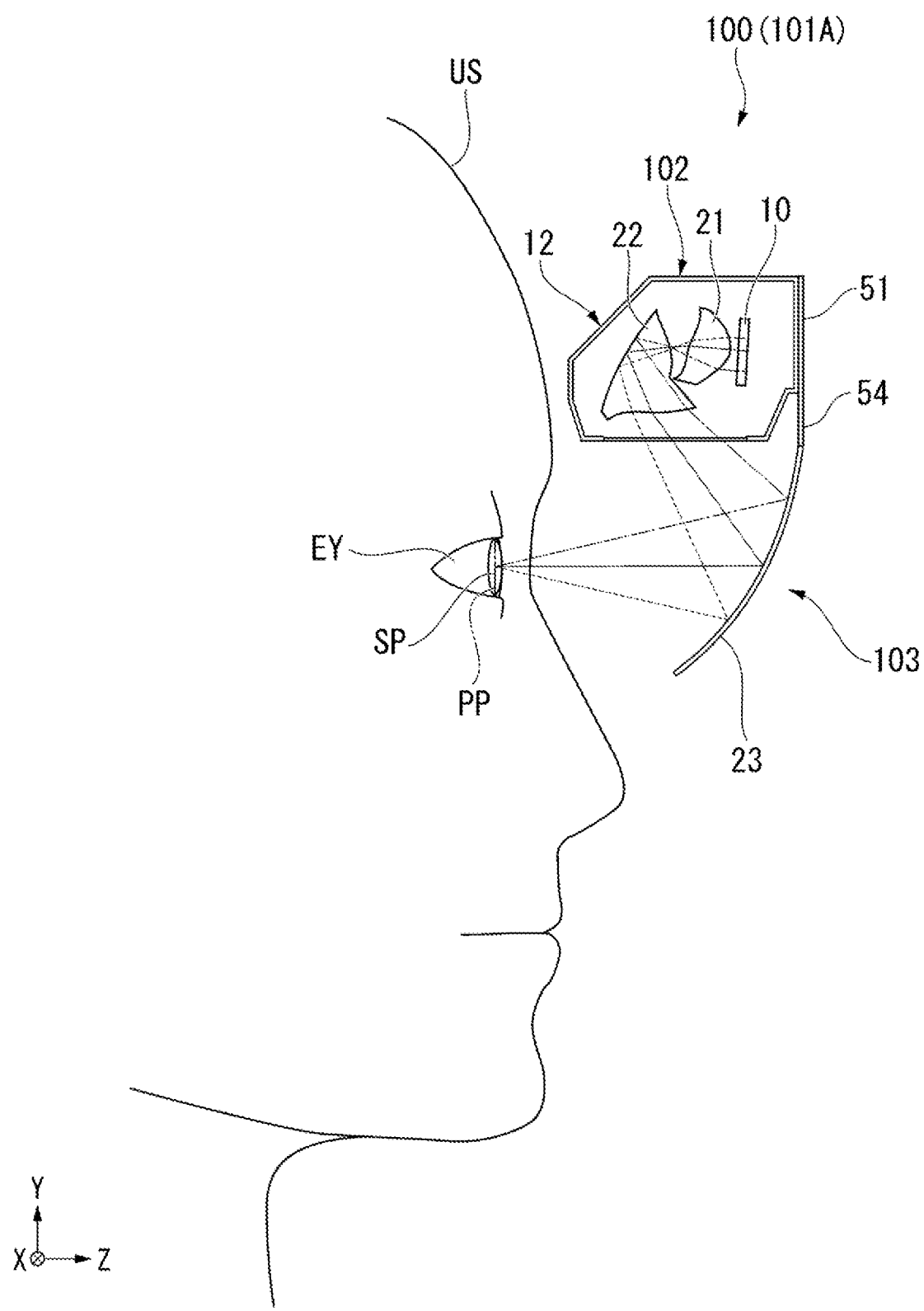
FIG. 2 is a vertical cross-sectional view of a virtual image display apparatus.
Figure 3:
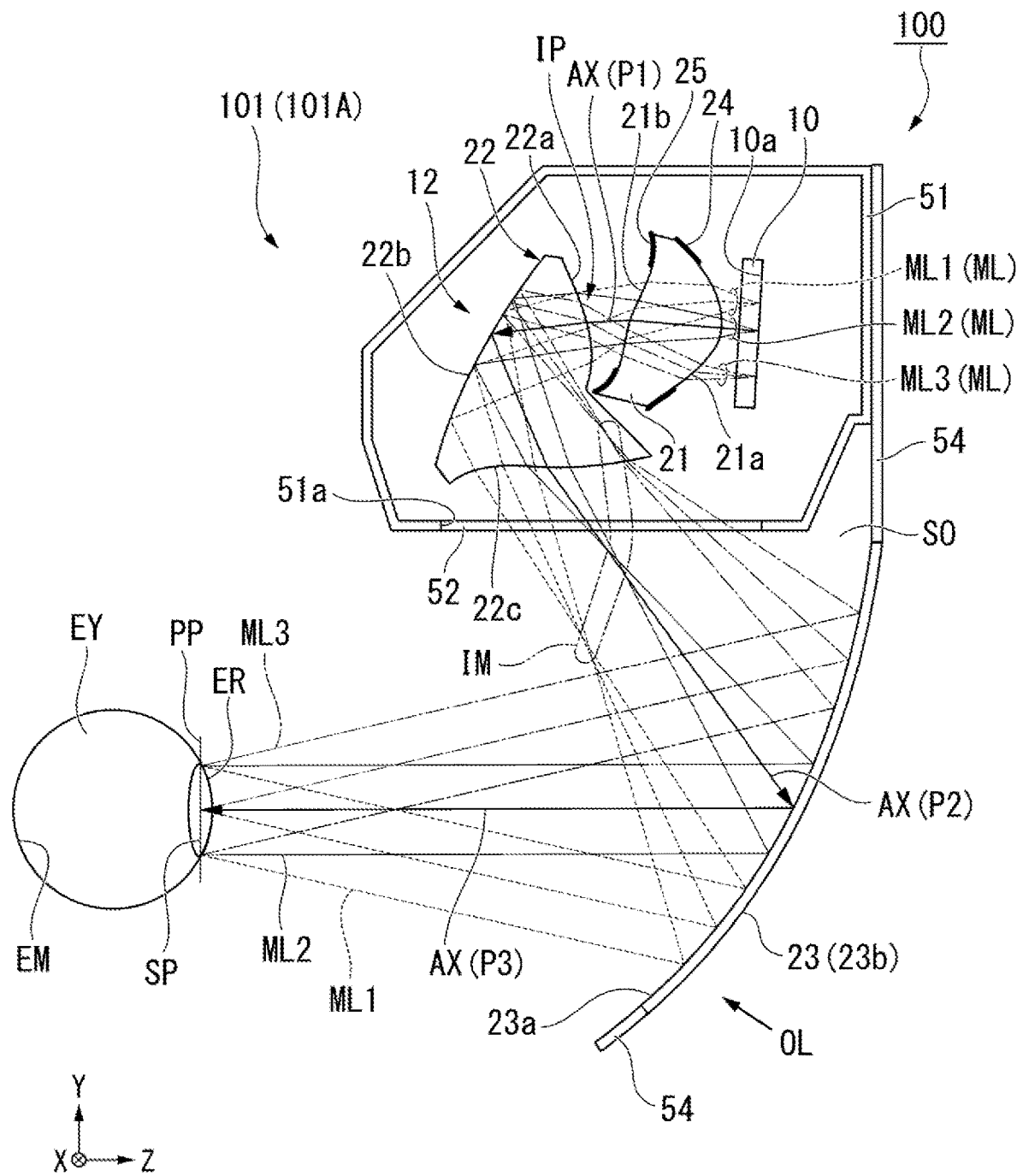
FIG. 3 is a vertical cross-sectional view illustrating an internal structure of a virtual image display apparatus.

FIG. 1 is an external perspective view illustrating a state of wearing a virtual image display apparatus of the first embodiment. FIG. 2 is a vertical cross-sectional view of the virtual image display apparatus. FIG. 3 is a vertical cross-sectional view illustrating an internal structure of the virtual image display apparatus.

A virtual image display apparatus 100 of the first embodiment is a head-mounted display (HMD) having a glass-like appearance, and causes a user or a user US wearing this apparatus to recognize videos as virtual images, as illustrated in FIGS. 1 and 2. In FIGS. 1 and 2, X, Y, and Z are an orthogonal coordinate system. A +X direction corresponds to a direction in which both eyes of the user US wearing the virtual image display apparatus 100 are aligned, and is defined as a lateral direction in this specification. A +Y direction corresponds to an upward direction orthogonal to the lateral direction of both eyes for the user US, and a +Z direction corresponds to the forward direction or the frontal direction for the user US.

The virtual image display apparatus 100 includes a first display module 101A forming a virtual image with respect to the right eye, a second display module 101B forming a virtual image with respect to the left eye, and a temple-shaped temple member 101C supporting the first display module 101A and the second display module 101B. That is, in the virtual image display apparatus 100, the first display module 101A and the second display module 101B are disposed side by side in the lateral direction.

The first display module 101A includes an optical unit 102 disposed at the upper portion, and an external appearance member 103 having a glass-lens shape and covering the whole of the module. The second display module 101B includes, as in the first display module 101A, the optical unit 102 disposed at the upper portion, and the external appearance member 103 having a glass-lens shape and covering the whole of the module. The temple member 101C supports the first display module 101A and the second display module 101B, by an non-illustrated member disposed at the back of the external appearance member 103, at the top end side of the external appearance member 103. The second display module 101B has the same structure as the first display module 101A, thus the first display module 101A will be described below as an example, and the description of the second display module 101B will be omitted. In the following description, the first display module 101A is simply referred to as a display module 101.

The display module 101 includes a display element 10 and a light-guiding optical system (light-guiding optical device) 12, as illustrated in FIGS. 2 and 3.

The display element 10 is constituted by a self-luminous display device, represented by an organic electroluminescence (EL) element, an inorganic EL element, a light-emitting diode (LED) array, an organic LED, a laser array, a quantum dot light-emitting element, and the like, for example. The display element 10 forms a still color image or a moving color image on an image emission surface 10a in two-dimension. The display element 10 is driven by a non-illustrated drive control circuit to perform a display operation.

When an organic EL display or a display is used as the display element 10, the display element 10 is configured to include an organic EL control unit. When a quantum dot light-emitting display is used as the display element 10, the display element 10 is configured to emit green or red color light by causing a quantum dot film to be irradiated with light from a blue light-emitting diode (LED). The display element 10 may also be, without being limited to a self-luminous display element, constituted by a liquid crystal display (LCD) or the other light modulation element. The display element 10 may be an element that causes the light modulation element to be illuminated with a light source such as a backlight to form an image. A liquid crystal on silicon (LCOS, where LCOS is a trade name), a digital micromirror device, and the like may be used, in place of the LCD, for the display element 10.

The light-guiding optical system 12 may also be referred to as a light-guiding optical device in view of guiding image light ML emitted from the display element 10 to a pupil position PP. The light-guiding optical system 12 includes a projection lens (first optical member) 21, a prism 22, a see-through mirror 23, a first light-shielding portion 24, and a second light-shielding portion 25. Details of the first light-shielding portion 24 and the second light-shielding portion 25 will be described later.

The projection lens 21 collects the image light ML emitted from the display element 10 into a state close to a parallel luminous flux, as illustrated in FIG. 3. The projection lens 21 is a single lens in the illustrated example, and includes an incidence surface (first optical surface) 21a and an emission surface (second optical surface) 21b. Note that the projection lens 21 may also be constituted by multiple lenses. In the first embodiment, the display element 10 is disposed in the forward direction (the +Z direction) from the projection lens 21.

The prism 22 includes an incidence surface 22a, an inner reflective surface 22b, and an emission surface 22c. The prism 22 causes the image light ML emitted from the projection lens 21 to be incident while refracting the image light ML at the incidence surface 22a to be totally reflected by the inner reflective surface 22b, and to be emitted while refracting the image light ML from the emission surface 22c. The prism 22 is located in the upper direction (the +Y direction) from the see-through mirror 23. The see-through mirror 23 reflects the image light ML emitted from the prism 22 toward the pupil position PP to form an exit pupil SP. The position at which the exit pupil SP is formed is referred to as the pupil position PP. Rays of image light from the points on the image emission surface 10a are incident on the pupil position PP in a manner being superimposed, in a predetermined divergent state or a parallel state, in an angular direction corresponding to the positions of the points on the image emission surface 10a. The image light is imaged on a retina EM of an eye EY. In the light-guiding optical system 12 of the first embodiment, the field of view (FOV) is 44 degrees, for example. The display area of the virtual image by the light-guiding optical system 12 is in a rectangular shape, and the above-described 44 degrees is an angle in the diagonal direction.

The projection lens 21 and the prism 22 are housed in a case 51 together with the display element 10. The case 51 is formed of a light-shielding material, and includes a non-illustrated built-in drive circuit that causes the display element 10 to operate. The case 51 includes an aperture 51a, and the aperture 51a has a size that causes the image light ML traveling from the prism 22 toward the see-through mirror 23 to avoid interference with the case 51. The aperture 51a of the case 51 is covered by a protective cover 52 having light-transmissivity. The protective cover 52 is formed of a material such as a resin that does not have optical power and causes the image light ML to pass without being attenuated. The protective cover 52 can cause the storage space inside the case 51 to be in a sealed state, and can enhance functions such as dust prevention, anti-exposure, and prevention of contact with an optical surface. That is, the protective cover 52 has a function as a dust-proof member at the case 51.

The see-through mirror 23 is supported, via a support plate 54, by the case 51. The case 51 or the support plate 54 is supported by the temple member 101C illustrated in FIG. 1, and the support plate 54 and the see-through mirror 23 constitute the external appearance member 103.

The light-guiding optical system 12 of the first embodiment is constituted by an off-axis optical system, and the projection lens 21, the prism 22, and the see-through mirror 23 are arranged to form the off-axis optical system. Here, the off-axis optical system refers to a system in which the optical path bends as a whole, at the projection lens 21, the prism 22, and the see-through mirror 23 that constitute the light-guiding optical system 12, before and after light rays are incident on at least one reflective surface or refractive surface. That is, in the light-guiding optical system 12 that is an off-axis optical system, the optical axis AX is bent such that the optical axis AX extends along an off-axis surface SO corresponding to the plane of paper.

That is, in the light-guiding optical system 12 of the first embodiment, the optical axis AX is bent within the off-axis surface SO to align the projection lens 21, the prism 22, and the see-through mirror 23 along the off-axis surface SO. The off-axis surface SO is a surface that causes asymmetry in multiple stages in the off-axis optical system. In this specification, the optical axis AX extends along the optical path of the principal light ray of the image light emitted from the center of the image emission surface 10a of the display element 10, where the optical axis AX is defined as an axis passing through the center of an eye ring ER or a pupil corresponding to the eye point. That is, the off-axis surface SO at which the optical axis AX is disposed is parallel to a YZ plane, and passes through the center of the display element 10 and the center of the eye ring ER corresponding to the eye point. The optical axis AX is disposed in a Z shape when viewed in the lateral cross section. That is, in the off-axis surface SO, an optical path P1 from the projection lens 21 to the inner reflective surface 22b, an optical path P2 from the inner reflective surface 22b to the see-through mirror 23, and an optical path P3 from the see-through mirror 23 to the pupil position PP are arranged being folded back twice in a Z shape.

In the light-guiding optical system 12, the optical path P1 from the projection lens 21 to the inner reflective surface 22b is disposed being inclined so as to be directed upward as approaching, in the frontal direction (a Z direction), from the side of the display element 10 toward the side of the prism 22. Here, the frontal direction refers to a visual line direction when the eyes of the user face right frontward. That is, in the optical path P1, the optical axis AX extends substantially parallel to the Z direction or the frontal direction. The projection lens 21 is disposed, in relation to the Z direction or the frontal direction, at a position interposed between the prism 22 and the display element 10. In this case, the optical path P1 spanning from the prism 22 to the display element 10 is inclined such that the prism 22 is on the upper side, as described above. It is desired for the orientation of the optical axis AX in the optical path P1 to be within a range of approximately from −30 degrees to +30 degrees on average, provided that, along the Z direction, the downwardness is the negative and the upwardness is the positive. It is possible, by setting the optical axis AX of the optical path P1 in a state of being downward at −30 degrees or greater toward the Z direction, to avoid an interference of the projection lens 21 or the display element 10 with the see-through mirror 23. It is also possible, by setting the optical axis AX of the optical path P1 in a state of being upward at +30 degrees or less toward the Z direction, to suppress the projection lens 21 and the display element 10 from protruding upward to become visually conspicuous.

It is desired for the optical axis AX, in the optical path P2 from the inner reflective surface 22b to the see-through mirror 23, to be within a range of approximately −70 degrees to −45 degrees on average, provided that, along the Z direction, the downwardness is the negative and the upwardness is the positive. It is possible, by setting the optical axis AX of the optical path P2 in a state of being downward at −70 degrees or greater toward the Z direction, to avoid overly increasing the overall inclination of the see-through mirror 23. It is also possible, by setting the optical axis AX of the optical path P2 in a state of being downward at −45 degrees or less toward the Z direction, to avoid the prism 22 from being disposed excessively protruding in a −Z direction or the back direction with respect to the see-through mirror 23, which makes it possible to avoid an increase in the thickness of the light-guiding optical system 12.

The optical path P3 from the see-through mirror 23 to the pupil position PP is disposed being inclined so as to be directed upward as approaching, in the direction (the Z direction), from the side of the see-through mirror 23 toward the side of the eye EY. In the illustrated example, the optical axis AX is at approximately −10 degrees, provided that, along the Z direction, the downwardness is the negative. This is because the human visual line is stabilized in a state where the eyes slightly downcast approximately 10 degrees inclined downward from the horizontal direction.

Note that, in the virtual image display apparatus 100 of the first embodiment, the central axis in the horizontal direction with respect to the pupil position PP is set assuming the case where the user US wearing the virtual image display apparatus 100 relaxes in an upright posture and gazes, facing the front, the horizontal direction or the horizontal line. Although the shape and posture of the head are various, which includes the arrangement of the eyes, the arrangement of the ears, and the like of an individual user US wearing the virtual image display apparatus 100, it is possible, by assuming the head shape or head posture on average of the user US, to set a central axis on average for the virtual image display apparatus 100 to which attention is paid. In the case of the virtual image display apparatus 100 of the first embodiment, the reflection angle of light rays along the optical axis AX is supposed to range approximately from 10 degrees to 60 degrees in the inner reflective surface 22b of the prism 22. Also, in the see-through mirror 23, the reflection angle of the light rays along the optical axis AX is supposed to range approximately from 20 degrees to 45 degrees.

With respect to the optical path P2 and the optical path P3 of the principal light ray, a first distance between the see-through mirror 23 and the prism 22 is set to be not greater than a second distance between the see-through mirror 23 and the pupil position PP. In this case, it is possible to suppress the protrusion amount that the prism 22 protrudes to the periphery of the see-through mirror 23, that is, upward. Here, the first distance and the second distance are designated as distances along the optical axis AX. In the case where other optical elements are added onto the optical paths P2 and P3 inside the see-through mirror 23, it is sufficient for the values of the first distance and the second distance to be determined by converting the added optical elements into an optical path length or optical distance.

In the light-guiding optical system 12 of the first embodiment, it is desired, with respect to the Y direction, for the position of the light rays passing through the most upper side in the vertical direction to be 30 mm or less with reference to the center of the pupil position PP. It is possible, by causing the light rays to be within such a range, to avoid the projection lens 21 or the display element 10 from being disposed protruding in the upward direction or the +Y direction. This makes it possible to suppress the amount of the projection lens 21 or the display element 10 overhanging upward from the eyebrows, which ensures design quality. That is, the optical unit 102 including the display element 10, the projection lens 21, and the prism 22 can be miniaturized.

Also, in the light-guiding optical system 12 of the first embodiment, in relation to the frontal direction or the Z direction, the positions, spanning from the see-through mirror 23 to the display element 10, of the whole light rays are set to 13 mm or greater with reference to the pupil position PP. It is possible, by causing the light rays to be within such a range, to dispose particularly the see-through mirror 23 so as to be sufficiently separated in the frontal direction or the +Z direction from the pupil position PP.

Also, in the light-guiding optical system 12 of the first embodiment, in relation to the frontal direction or the Z direction, the positions, spanning from the see-through mirror 23 to the display element 10, of the whole light rays are set to 40 mm or greater with reference to the pupil position PP. It is possible, by causing the light rays to be within such a range, to cause particularly the see-through mirror 23 to be disposed so as not to be excessively separated in the frontal direction or the +Z direction from the pupil position PP. This facilitates to suppress the frontward protrusion of the see-through mirror 23, the display element 10, and the like, which ensures design quality. As for the bottom end of the prism 22, it is disposed, in relation to the vertical direction or the Y direction, at a position of not less than 10 mm with reference to the center of the pupil position PP. This facilitates to secure a see-through view such as 20 degrees in the upward direction, for example.

In the light-guiding optical system 12 of the first embodiment, the incidence surface 21a and the emission surface 21b that are optical surfaces constituting the projection lens 21 are within the off-axis surface SO parallel to the YZ plane, have an asymmetrical shape across the optical axis AX (non-axially symmetrical shape) in relation to the vertical direction orthogonal to the optical axis AX, and have a symmetrical shape across the optical axis AX (axially symmetrical shape) in relation to the lateral direction (an X direction).

The projection lens 21 is formed of resin or the like, and may also be formed of glass. The incidence surface 21a and the emission surface 21b of the projection lens 21 are each constituted by a free curved surface, for example. Note that the incidence surface 21a and the emission surface 21b are not limited to the free curved surface, and may also be an aspherical surface. In the projection lens 21, the aberration is reduced by causing the incidence surface 21a and the emission surface 21b to be the free curved surface or the aspherical surface. In particular, it facilitates, when using the free curved surface, to reduce the aberration of the light-guiding optical system 12 that is an off-axis optical system or a non-coaxial optical system. Note that the free curved surface is a surface without an axis of rotational symmetry, where as a surface function of the free curved surface, various polynomials may be used. Also, the aspherical surface is a surface that has the axis of rotational symmetry, and is a paraboloid, or a surface other than a spherical surface, represented by a polynomial. Although detailed description is omitted, an anti-reflective film is formed on the incidence surface 21a and the emission surface 21b.

Accordingly, it is possible to partly compensate the decentration of the light-guiding optical system 12 as an off-axis optical system in the projection lens 21, which contributes to an improvement in aberrations. Also, the relative inclination between the incidence surface 21a and the emission surface 21b is used to partly compensate the chromatic aberration of the projection lens 21.

The prism 22 is a refractive/reflective optical member having a function obtained by combining a mirror and a lens. Thus, the prism 22 reflects the image light ML emitted from the projection lens 21 while refracting the image light ML. More specifically, in the prism 22, the image light ML is incident inward through the incidence surface 22a that is a refractive surface, totally reflected in a non-specular direction by the inner reflective surface 22b that is a reflective surface, and is emitted to the outside through the emission surface 22c that is a refractive surface.

The incidence surface 22a and the emission surface 22c are optical surfaces formed of curved surfaces, and contribute to an improvement in resolution compared to when only the reflective surface is used, or when the incidence surface 22a and the emission surface 22c are planar surfaces. The incidence surface 22a, the inner reflective surface 22b, and the emission surface 22c that are optical surfaces constituting the prism 22 are within the off-axis surface SO parallel to the YZ plane and have anti-symmetry across the optical axis AX in relation to the vertical direction intersecting the optical axis AX, and have symmetry across the optical axis AX in relation to the lateral direction (the X direction). The prism 22 has a lateral width in the horizontal direction or the X direction, which is greater than the vertical width in the vertical direction or the Y direction, in terms of not only the physical contour, but also the optically effective area. This makes it possible to enlarge the view angle in the lateral direction or the Y direction. Also, corresponding to the laterally large movement of the eye EY, an image can be viewed even if the visual line significantly changes in the lateral direction.

The prism 22 is formed of resin or the like, and may also be formed of glass. The refractive index of the main body of the prism 22 is set to a value such that the total reflection at the inner surface is accomplished with reference to the reflection angle of the image light ML. It is preferred for the refractive index and the Abbe number of the main body of the prism 22 to be set also in view of the relationship with the projection lens 21. In particular, it is possible, by increasing the Abbe number of the prism 22 or the projection lens 21, to reduce the chromatic dispersion.

The optical surface of the prism 22, that is, the incidence surface 22a, the inner reflective surface 22b, and the emission surface 22c are each constituted by a free curved surface, for example. Note that each of the incidence surface 22a, the inner reflective surface 22b, and the emission surface 22c is not limited to the free curved surface, and may also be an aspherical surface. In the prism 22, it is possible, by causing the incidence surface 22a, the inner reflective surface 22b, and the emission surface 22c to be a free curved surface or an aspherical surface, to reduce the aberration. In particular, it facilitates, when using the free curved surface, to reduce the aberration of the light-guiding optical system 12 that is an off-axis optical system or a non-coaxial optical system, which ensures an improvement in resolution. The inner reflective surface 22b is not limited to a reflective surface that reflects by total reflection the image light ML, and may also be a reflective surface formed of a metal film or a dielectric multilayer film. In this case, a reflective film formed of a single layer film or a multilayer film formed of a metal such as Al and Ag, for example, is deposited on the inner reflective surface 22b by vapor deposition or the like, or a sheet-shaped reflective film formed of a metal is affixed onto the inner reflective surface 22b. Although detailed description is omitted, an anti-reflective film is formed on the incidence surface 22a and the emission surface 22c.

The prism 22 is collectively formed by forming by injection molding the incidence surface 22a, the inner reflective surface 22b, and the emission surface 22c, which reduces the number of parts and increases the accuracy as to the mutual positions of the three surfaces, for example, at a level such as 20 μm or less at a relatively low cost.

The see-through mirror 23 is a plate-like optical member that functions as a concave surface mirror, and reflects the image light ML emitted from the prism 22. The see-through mirror 23 has a concave shape as viewed from the pupil position PP together with covering the pupil position PP at which the eye EY or the pupil is disposed. The see-through mirror 23 has a structure in which a reflective surface 23a composed of a mirror film is formed on one surface of a plate-like body 23b.

The reflective surface 23a of the see-through mirror 23 is within the off-axis surface SO parallel to the YZ plane and has an asymmetrical shape across the optical axis AX in relation to the vertical direction intersecting the optical axis AX, and has a symmetrical shape across the optical axis AX in relation to the lateral direction or the X direction. The reflective surface 23a of the see-through mirror 23 is constituted by a free curved surface, for example. Note that the reflective surface 23a is not limited to the free curved surface, and may also be an aspherical surface. The aberration is reduced by causing the see-through mirror 23 to be the free curved surface or the aspherical surface. In particular, it facilitates, when using the free curved surface, to reduce the aberration of the light-guiding optical system 12 that is an off-axis optical system or a non-coaxial optical system.

The see-through mirror 23 has a shape in which the original point of the curved surface is shifted toward the side of the projection lens 21 or the side of the display element 10 from an effective area of the see-through mirror 23, in either case that the reflective surface 23a is the free curved surface or the aspherical surface. In this case, it is possible to design the inclined surface of the see-through mirror that materializes a Z shaped optical path without causing excessive burden on the design of the optical system.

The see-through mirror 23 is a transmissive reflective element that reflects a part of light incident on the see-through mirror 23, and transmits the other part of light. Thus, the reflective surface 23a of the see-through mirror 23 has semi-transmissivity. Accordingly, external light OL passes through the see-through mirror 23 to thus enable see-through view of the external world, which causes the user to view a state where a virtual image is superimposed on an external image.

At this time, it is possible, by causing the plate-like body 23b to have a thin thickness of not greater than approximately several millimeters, to minimize a change in magnification ratio of the external image. It is desired for the reflectance of the reflective surface 23a with respect to the image light ML and the external light OL to be set to 10% or greater and 50% or less in the range of the incidence angle of the assumed image light ML in terms of securing the luminance of the image light ML or facilitating the observation by see-through of the external image.

The plate-like body 23b that is the base material of the see-through mirror 23 is formed of resin or the like, and may also be formed of glass. The plate-like body 23b is formed of the same material as the support plate 54 that supports the plate-like body 23b from the periphery, and has the same thickness as the support plate 54. The reflective surface 23a is formed of a dielectric multilayer film composed of multiple dielectric layers in which a film thickness is adjusted, for example. The reflective surface 23a may also be a single layer film or a multilayer film of metal such as Al and Ag in which a film thickness is adjusted. The reflective surface 23a can be formed by layering the above-described films, and may also be formed by affixing a sheet-shaped reflective film thereto.

In the light-guiding optical system 12 of the first embodiment, an intermediate pupil IP is formed between the projection lens 21 and the inner reflective surface 22b of the prism 22, and closer to the incidence surface 22a of the prism 22 than the projection lens 21 and the inner reflective surface 22b. More specifically, the intermediate pupil IP is formed at the position of or near the position of the incidence surface 22a of the prism 22. The intermediate pupil IP is disposed on the side of the inner reflective surface 22b from the incidence surface 22a of the prism 22, for example. In this case, the position of the intermediate pupil IP is set closer to the incidence surface 22a than the inner reflective surface 22b. The intermediate pupil IP may be disposed on the side of the projection lens 21 from the incidence surface 22a of the prism 22. In this case, the position of the intermediate pupil IP is set closer to the incidence surface 22a than the emission surface 21b of the projection lens 21. The intermediate pupil IP may intersect the incidence surface 22a of the prism 22. The intermediate pupil IP corresponds to the position at which principal light rays are collected of image light from each of the points on the image emission surface 10a of the display element 10, and corresponds to the conjugate point of the eye ring ER or the pupil position PP.

An intermediate image IM is formed between the prism 22 and the see-through mirror 23. Note that the intermediate image IM is formed closer to the prism 22 than the see-through mirror 23. The intermediate image IM is a real image formed at a position, upstream in the optical path of the eye ring ER, conjugate to the image emission surface 10a.

Here, the image light is Lambertian light emitted from each of the pixels in the image emission surface 10a of the display element 10, and thus each of the image light has predetermined angular distributions. When the image light is partially incident, as stray light, on the pupil position PP through a path different from a predetermined optical path inside the light-guiding optical system 12, which becomes a contributing factor such as a ghost that degrades an image visible to the user US. In view of the above, it is possible, by blocking in advance the unnecessary light becoming the contributing factor such as a ghost and by preventing the light form being incident on the pupil position PP to allow the user US to visually recognize a high-quality image. It is conceivable to dispose a diaphragm member (an aperture diaphragm) at or near the position of the intermediate pupil IP, for example. In the light-guiding optical system 12 of the first embodiment, a part of the intermediate pupil IP is disposed inside the prism 22, which makes it difficult to place the diaphragm member at the intermediate pupil IP.

In the light-guiding optical system 12 of the first embodiment, in place of providing the diaphragm member near the intermediate pupil IP, a light-shielding portion is formed by applying a light-shielding coating material onto the optical surface of the optical member located in the optical path of the image light ML emitted from the display element 10, to thus block the unnecessary light included in the image light ML.

FIG. 3 illustrates the image light ML emitted from three points on the image emission surface 10a. In FIG. 3, the image light ML located on the uppermost side (a +Y side) is referred to as upper stage image light ML1. In addition, in FIG. 3, the image light ML located on the lowermost side (a −Y side) is referred to as lower stage image light ML3. Further, in FIG. 3, the image light ML located between the upper stage image light ML1 and the lower stage image light ML3 is referred to as middle stage image light ML2.

In the case of the first embodiment, the light-guiding optical system 12 is an off-axis optical system, thus a difference occurs in the luminous flux widths of the upper stage image light ML1, the middle stage image light ML2, and the lower stage image light ML3 that are emitted from each of the pixels in the image emission surface 10a and collected at the intermediate pupil IP within the off-axis surface SO.

In the first embodiment, the optical path length, up to the pupil position PP, of the upper stage image light ML1 is less than the optical path length, up to the pupil position PP, of the lower stage image light ML3, thus the upper stage image light ML1 needs to be guided so as to expand the luminous flux width compared to the lower stage image light ML3, for example. Accordingly, at the intermediate pupil IP, the luminous flux width of the upper stage image light ML1 is greater than the luminous flux width of the lower stage image light ML3.

Thus, it is difficult, when using an off-axis optical system such as the light-guiding optical system 12 of the first embodiment, to sufficiently block the unnecessary light only by forming a light-shielding portion at one optical surface.

In contrast, in the light-guiding optical system 12 of the first embodiment, the first light-shielding portion 24 and the second light-shielding portion 25 are formed at the incidence surface 21a and the emission surface 21b that are two optical surfaces of the projection lens 21, to thus block the unnecessary light incident, via the light-guiding optical system 12, on the pupil position PP.

In the following, the configurations of the first light-shielding portion 24 and the second light-shielding portion 25 will be described.

Figure 4:
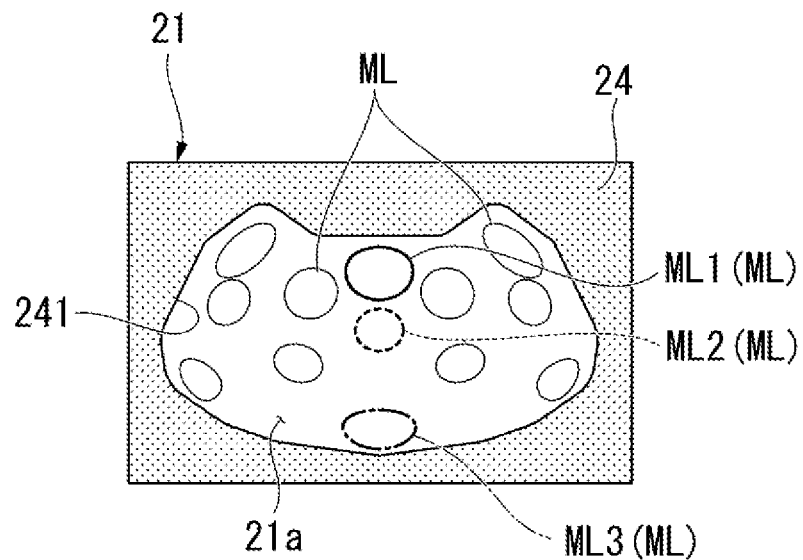
FIG. 4 is a plan view of an incidence surface of a projection lens.
Figure 5:
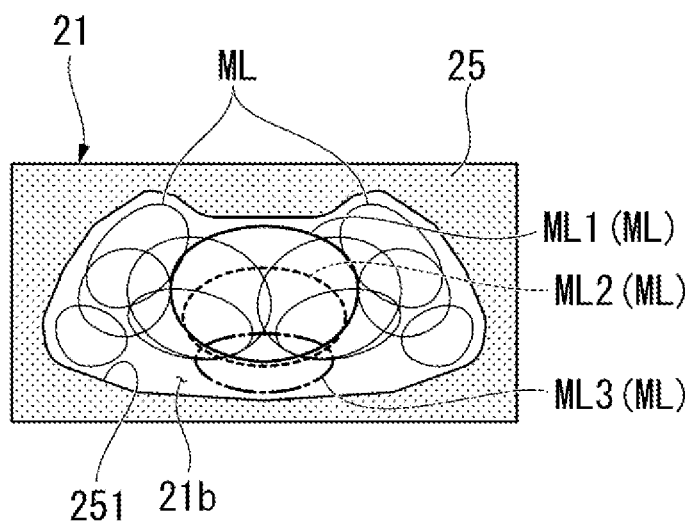
FIG. 5 is a plan view of an emission surface of a projection lens.

FIG. 4 is a plan view of the incidence surface 21a of the projection lens 21 when viewed from the normal direction along the optical axis AX. FIG. 5 is a plan view of the emission surface 21b of the projection lens 21 when viewed from the normal direction along the optical axis AX.

Note that in FIGS. 4 and 5, the upper stage image light ML1, the middle stage image light ML2, and the lower stage image light ML3 that are illustrated in FIG. 3 are each distinguished and illustrated by different line types, and the upper stage image light ML1, the middle stage image light ML2, and the lower stage image light ML3 are indicated by an identical line type.

In the following, when describing the arrangement relationship of each of the members in FIGS. 4 and 5, the upwardness in the drawings may be referred to as an upper side, and the downwardness in the drawings may be referred to as a lower side, as a matter of convenience.

As illustrated in FIGS. 3 and 4, the first light-shielding portion 24 is formed at the incidence surface 21a. The first light-shielding portion 24 exposes, through a first aperture 241, a part of the incidence surface 21a. The first light-shielding portion 24 is formed by a light-shielding coating film applied onto the incidence surface 21a. In the case of the first embodiment, a micro concave-convex shaped portion 62 (see FIG. 6) is formed at the area where the first light-shielding portion 24 is formed in the incidence surface 21a. This causes a light-shielding coating film 63 (see FIG. 6) constituting the first light-shielding portion 24 to be in a state of being in good contact, via the concave-convex shaped portion 62, with the incidence surface 21a.

The first aperture 241 of the first light-shielding portion 24 is formed in shape corresponding to an effective area of the incidence surface 21a. Here, the effective area refers to a predetermined area, in the entire area of the incidence surface 21a, that can guide, up to the pupil position PP, each of the incident image light as effective light rather than stray light. That is, the image light incident on the outer side of the effective area becomes light that is unnecessary (unnecessary light) that may be incident as stray light on the pupil position PP.

The first aperture 241 is within the off-axis surface SO and has an asymmetrical shape across the optical axis AX in relation to a first direction (the up-down direction in FIG. 4) orthogonal to the optical axis AX of the light-guiding optical system 12, and has a symmetrical shape in relation to a second direction (the left-right direction in FIG. 4) orthogonal to the first direction. That is, the first aperture 241 has an asymmetrical aperture shape in the up-down direction and has a symmetrical aperture shape in the left and right direction. That is, the first aperture 241 does not have an axially symmetrical aperture shape.

It is possible for the first light-shielding portion 24 of the first embodiment to cut constituents incident outside the effective area of the incidence surface 21a and to transmit the constituents incident, through the first aperture 241, on the effective area of the incidence surface 21a. This makes it possible to cut the unnecessary light included in the image light ML.

As illustrated in FIGS. 3 and 5, the second light-shielding portion 25 is formed at the emission surface 21b. The second light-shielding portion 25 exposes, through a second aperture 251, a part of the emission surface 21b. The second aperture 251 of the second light-shielding portion 25 is formed corresponding to an effective area of the emission surface 21b. The second light-shielding portion 25 is formed by a light-shielding coating film applied onto the emission surface 21b. In the case of the first embodiment, a micro concave-convex shaped portion is formed at the area where the second light-shielding portion 25 is formed in the emission surface 21b. This causes the light-shielding coating film constituting the second light-shielding portion 25 to be in good contact, via the concave-convex shaped portion, with the emission surface 21b.

As in the first aperture 241, the second aperture 251 has an asymmetrical aperture shape in the up-down direction in FIG. 5, and has a symmetrical aperture shape in the left and right direction in FIG. 5. That is, the second aperture 251 does not have an axially symmetrical aperture shape.

As described above, the light-guiding optical system 12 of the first embodiment is an off-axis optical system that does not have axial symmetry, thus the effective area of the emission surface 21b is different in shape from the effective area of the incidence surface 21a. Thus, the first aperture 241 and the second aperture 251 have mutually different shapes.

In addition, light incident on the incidence surface 21a of the projection lens 21 is emitted in a convergent state from the emission surface 21b, which causes the positions of the light rays of the image light ML on the emission surface 21b to become closer to one another than the positions of the light rays of the image light on the incidence surface 21a. Accordingly, the aperture area of the second aperture 251 is less than the aperture area of the first aperture 241.

It is possible for the second light-shielding portion 25 of the first embodiment to cut constituents incident outside the effective area of the emission surface 21b and to transmit the constituents incident, through the second aperture 251, on the effective area of the emission surface 21b. This makes it possible to cut the unnecessary light included in the image light ML.

Figure 6:
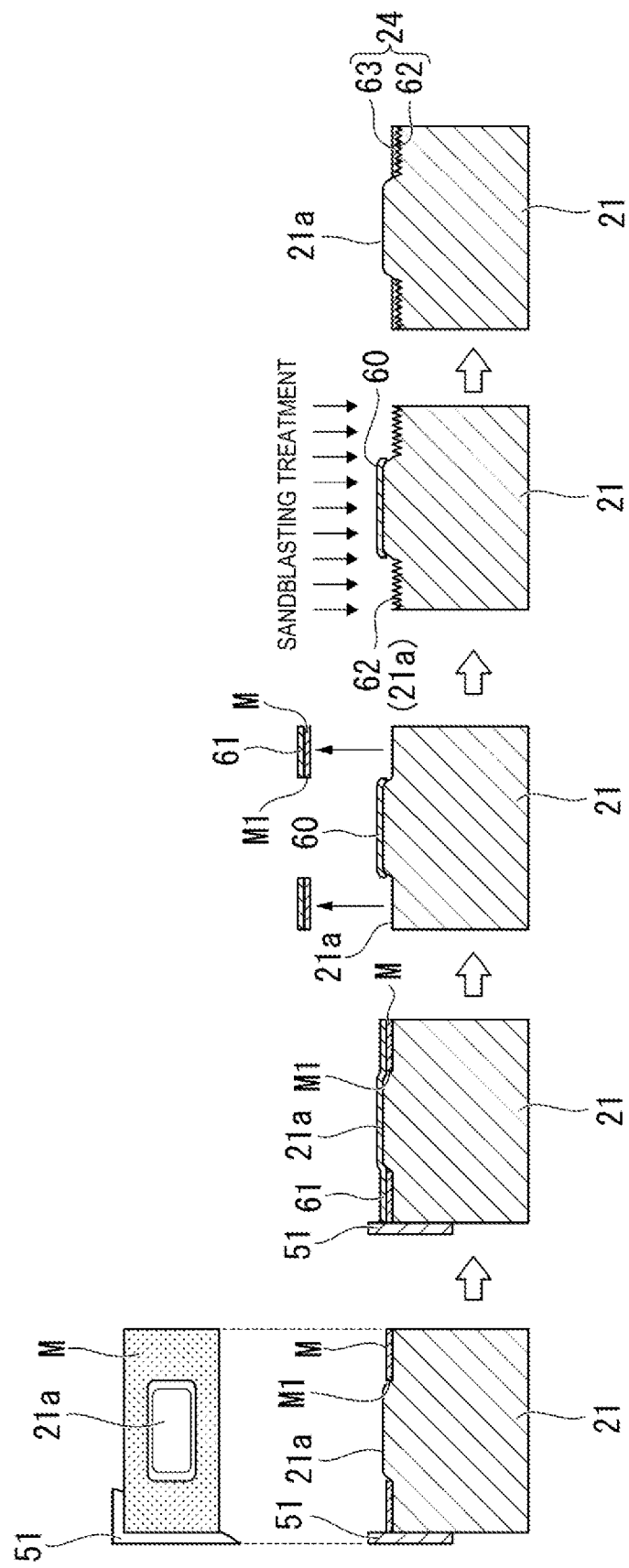
FIG. 6 is an operation flow illustrating an example of a manufacturing method for a light-guiding optical system.

A manufacturing method for the light-guiding optical system 12 of the first embodiment will now be described. FIG. 6 is an operation flow illustrating an example of a manufacturing method for the light-guiding optical system 12. In the following, a step for forming the first light-shielding portion 24 at the incidence surface 21a of the projection lens 21 will be described as an example.

As illustrated in FIG. 6, the manufacturing method for the light-guiding optical system 12 of the first embodiment includes a protective-layer forming step (a first forming step), a light-shielding portion forming step (a second forming step), and a peeling-off step.

The protective-layer forming step is a step for forming a protective layer 60 at the incidence surface 21a of the projection lens 21. In this step, a mask M is positioned on the optical surface using the case (support member) 51 supporting the projection lens 21, then a protective-layer formation member 61 is applied so as to cover the mask M. Note that the whole of the incidence surface 21a of the projection lens 21 is formed to be a mirror surface reflecting a mold surface.

An aperture portion M1 is formed at the mask M. The shape of the aperture portion M1 corresponds to the aperture shape of the first aperture 241. The mask M is in contact with the case 51, and is thus positioned at a predetermined position with respect to the projection lens 21. That is, in the mask M, the aperture portion M1 is positioned at the effective area of the incidence surface 21a (the area where the first light-shielding portion 24 is formed).

Accordingly, a portion, in the protective-layer formation member 61, that is applied so as to cover the mask M, which is applied inside the aperture portion M1, is caused to be in a state of being applied onto the effective area of the incidence surface 21a. Note that the protective-layer formation member 61 is not particularly limited as long as the protective-layer formation member 61 is a material that can protect the incidence surface 21a from a sandblasting treatment described later.

Next, the mask M is removed, after the application of the protective-layer formation member 61, from the incidence surface 21a. At this time, the protective-layer formation member 61 covering the mask M is removed from the incidence surface 21a together with the mask M, and only the portion applied inside the aperture portion M1 selectively remains on the incidence surface 21a. This causes the protective layer 60 to be formed at a position corresponding to the aperture portion M1 of the mask M, that is, in the effective area of the incidence surface 21a.

After the course of the above, the protective-layer forming step is terminated.

After the protective-layer forming step, the process proceeds to the light-shielding portion forming step. The light-shielding portion forming step is a step for forming the first light-shielding portion 24 at an area, in the incidence surface 21a, where the protective layer 60 is not formed. In this step, the micro concave-convex shaped portion 62 is formed at the area, in the incidence surface 21a, that is not covered by the protective layer 60. The concave-convex shaped portion 62 is formed, using the sandblasting treatment, at the incidence surface 21a, for example. Next, the concave-convex shaped portion 62 is painted in black to form the light-shielding coating film 63 in the concave-convex shaped portion 62.

Through the course of the above, the first light-shielding portion 24 is formed on the incidence surface 21a, and the light-shielding portion forming step is terminated.

After the light-shielding portion forming step, the process proceeds to the peeling-off step. The peeling-off step is a step in which the protective layer 60 is peeled off from the projection lens 21 where the first light-shielding portion 24 is formed. According to this process, the protective layer 60 is peeled off from the incidence surface 21a, and the first light-shielding portion 24 can be formed at the incidence surface 21a of the projection lens 21.

As such, it is possible for the first light-shielding portion 24 to be formed at the incidence surface 21a of the projection lens 21. Note that the same steps as in the first light-shielding portion 24 described above are carried out to form the second light-shielding portion 25 at the emission surface 21b of the projection lens 21.

After forming the first light-shielding portion 24 and the second light-shielding portion 25 at the projection lens 21, the prism 22 is housed inside the case 51 and the see-through mirror 23 is attached via the support plate 54 to the case 51, thus making it possible to manufacture the light-guiding optical system 12.

Next, the optical path of the display module 101 of the first embodiment will be described.

The image light ML from the display element 10 is emitted in a state of being incident on the projection lens 21 to be substantially collimated. The image light ML passing through the projection lens 21 is incident on the prism 22 and emitted while being refracted from the incidence surface 21a, and is reflected by the inner reflective surface 22b at a high reflectance approximate to 100% to be refracted again by the emission surface 22c. The image light ML from the prism 22 is incident on the see-through mirror 23 and reflected at a reflectance of approximately 50% or less by the reflective surface 23a. The image light ML reflected by the see-through mirror 23 is incident on the pupil position PP at which the eye EY or the pupil of the user US is disposed. The intermediate image IM is formed, between the prism 22 and the see-through mirror 23, adjacently to the emission surface 22c of the prism 22. The external light OL passing through the see-through mirror 23 and the support plate 54 around the see-through mirror 23 is also incident on the pupil position PP. That is, the user US wearing the virtual image display apparatus 100 can observe, in superposition on an external image, a virtual image by the image light ML.

Thus, according to the light-guiding optical system 12 of the first embodiment, it is possible, by providing the first light-shielding portion 24 and the second light-shielding portion 25 formed at the incidence surface 21a and the emission surface 21b that are two optical surfaces of the projection lens 21 even if the diaphragm member cannot be disposed at the intermediate pupil IP due to the lack of axial symmetry, to cut the unnecessary light incident on the pupil position PP without using a diaphragm member. Thus, according to the display module 101 of the first embodiment, it is possible to enable the user US to view high-quality images.

As described above, according to the virtual image display apparatus 100 of the first embodiment, it is possible to accomplish miniaturization of the optical system, and to further accomplish miniaturization of the overall size of the apparatus. Thus, the virtual image display apparatus 100 of the first embodiment can be miniaturized while ensuring the resolution.

Second Embodiment

Next, the display module of the second embodiment will be described. The difference between the display module of the second embodiment and that of the first embodiment lies in the optical surface in which the light-shielding portion is provided. Note that configurations and members common to the first embodiment will be given identical reference numerals and detailed description will be omitted.

Figure 7:
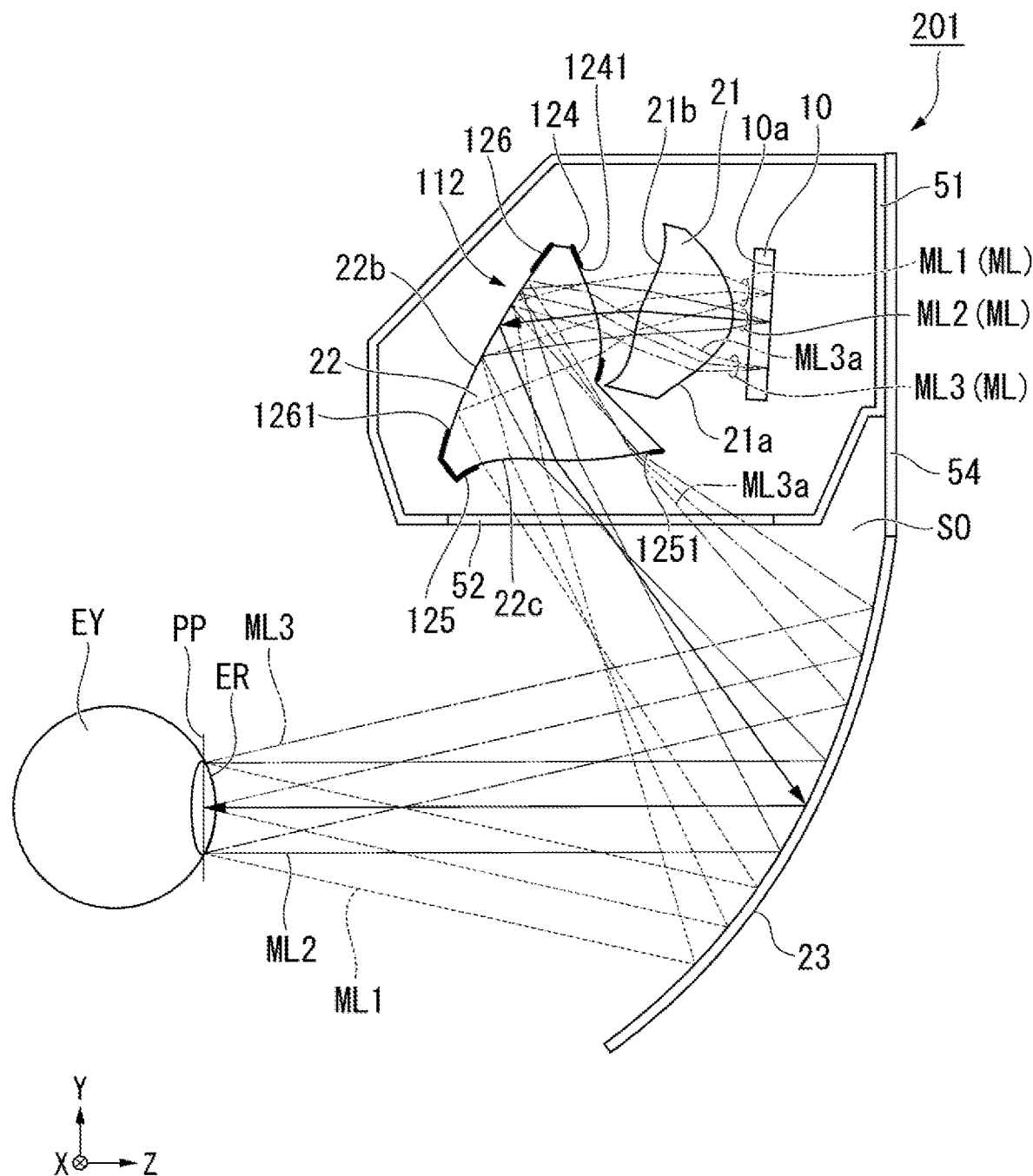
FIG. 7 is a diagram illustrating a main part of a display module of the second embodiment.

FIG. 7 is a diagram illustrating the main part of a display module 201 of the second embodiment. FIG. 7 is a diagram corresponding to FIG. 3 of the first embodiment, where illustrations of members and reference numerals that are not related to the description are omitted.

As illustrated in FIG. 7, in a light-guiding optical system 112 of the display module 201 of the second embodiment, a first light-shielding portion 124, a second light-shielding portion 125, and a third light-shielding portion 126 are formed at the incidence surface (first optical surface) 22a, the emission surface (second optical surface) 22c, and the inner reflective surface (third optical surface, reflective surface) of the prism 22, to thus block the unnecessary light incident, via the light-guiding optical system 112, on the pupil position PP.

Configurations of the first light-shielding portion 124, the second light-shielding portion 125, and the third light-shielding portion 126 will be described below.

Figure 8:
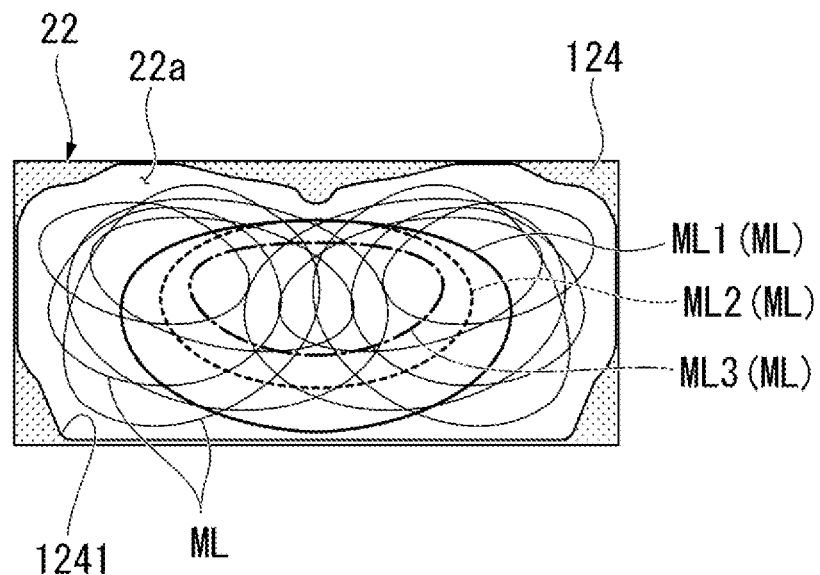
FIG. 8 is a plan view of an incidence surface of a prism of the second embodiment.
Figure 9:
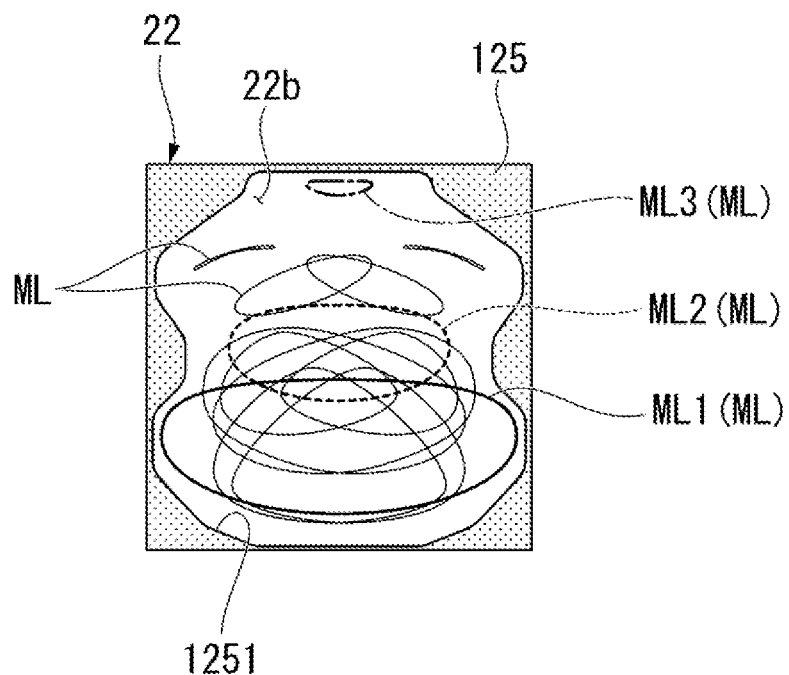
FIG. 9 is a plan view of an emission surface of a prism of the second embodiment.
Figure 10:
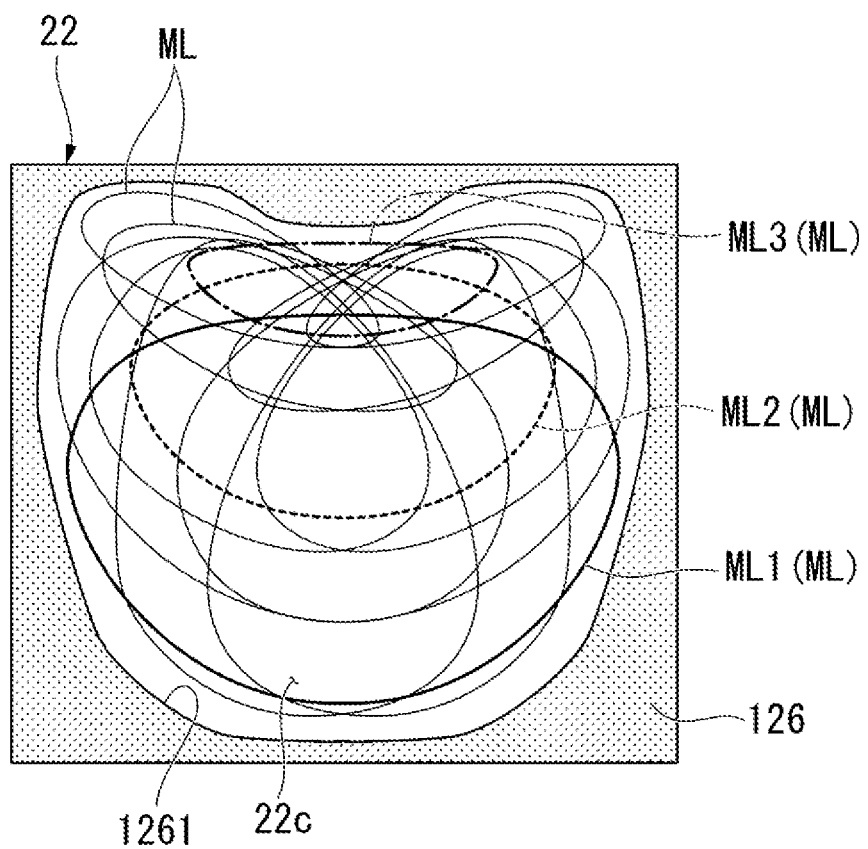
FIG. 10 is a plan view of an inner reflective surface of a prism of the second embodiment.

FIG. 8 is a plan view of the incidence surface 22a of the prism 22 when viewed from the normal direction along the optical axis AX. FIG. 9 is a plan view of the emission surface 22c of the prism 22 when viewed from the normal direction along the optical axis AX. FIG. 10 is a plan view of the inner reflective surface 22b of the prism 22 when viewed from the normal direction along the optical axis AX.

Note that, in FIGS. 7 to 10, the upper stage image light ML1, the middle stage image light ML2, and the lower stage image light ML3 are each distinguished and indicated by different line types, and the other image light ML emitted from the peripheral pixels around the pixels that emit the upper stage image light ML1, the middle stage image light ML2, and the lower stage image light ML3 is indicated by an identical line type.

As illustrated in FIGS. 7 and 8, the first light-shielding portion 124 is formed at the incidence surface 22a of the prism 22. The first light-shielding portion 124 exposes, through a first aperture 1241, a part of the incidence surface 22a. The first light-shielding portion 124 is formed by painting in black a part of the incidence surface 22a. The shape of the first aperture 1241 of the first light-shielding portion 124 is formed corresponding to an effective area of the incidence surface 22a.

The first aperture 1241 has an asymmetrical aperture shape in the up-down direction in FIG. 8, and has a symmetrical aperture shape in the left and right direction in FIG. 8. That is, the first aperture 1241 does not have an axially symmetrical aperture shape. It is possible for the first light-shielding portion 124 of the second embodiment to cut constituents incident outside the effective area of the incidence surface 22a and to transmit the constituents incident, through the first aperture 1241, on the effective area of the incidence surface 22a. This makes it possible to cut the unnecessary light included in the image light ML.

As illustrated in FIGS. 7 and 9, the second light-shielding portion 125 is formed at the emission surface 22c. The second light-shielding portion 125 exposes, through a second aperture 1251, a part of the emission surface 22c. The second aperture 1251 of the second light-shielding portion 125 is formed corresponding to an effective area of the emission surface 22c. The second light-shielding portion 125 is formed by a light-shielding coating film applied onto the emission surface 22c. In the case of the second embodiment, the micro concave-convex shaped portion is formed at the area where the second light-shielding portion 125 is formed in the emission surface 22c. This causes the light-shielding coating film constituting the second light-shielding portion 125 to be in good contact, via the concave-convex shaped portion, with the emission surface 22c.

As in the first aperture 1241, the second aperture 1251 has an asymmetrical aperture shape in the up-down direction in FIG. 9, and has a symmetrical aperture shape in the left and right direction in FIG. 9. That is, the second aperture 1251 does not have an axially symmetrical aperture shape.

The light-guiding optical system 112 of the second embodiment is an off-axis optical system that does not have axial symmetry, thus the effective area of the emission surface 22c is different in shape from the effective area of the incidence surface 22a. Thus, the first aperture 1241 and the second aperture 1251 have mutually different shapes.

It is possible for the second light-shielding portion 125 of the second embodiment to cut constituents incident outside the effective area of the emission surface 22c and to transmit the constituents incident, through the second aperture 1251, on the effective area of the emission surface 22c. This makes it possible to cut the unnecessary light included in the image light ML.

As illustrated in FIGS. 7 and 10, the third light-shielding portion 126 is formed at the inner reflective surface 22b. The third light-shielding portion 126 exposes, through a third aperture 1261, a part of the inner reflective surface 22b. The third aperture 1261 of the third light-shielding portion 126 is formed corresponding to an effective area of the inner reflective surface 22b. The third light-shielding portion 126 is formed by a light-shielding coating film applied onto the inner reflective surface 22b. In the case of the second embodiment, the micro concave-convex shaped portion is formed at the area, in the inner reflective surface 22b, where the third light-shielding portion 126 is formed. This causes the light-shielding coating film constituting the third light-shielding portion 126 to be in good contact, via the concave-convex shaped portion, with the inner reflective surface 22b.

Here, in FIG. 7, among three light rays that indicate the lower stage image light ML3 incident on the emission surface 22c, an attention will be focused on a light ray ML3a located on the left side of the principal light ray, for example. The upper stage image light ML1 is incident on the pupil position PP, through the first aperture 1241 of the first light-shielding portion 124, the third aperture 1261 of the third light-shielding portion 126, and the second aperture 1251 of the second light-shielding portion 125.

The light ray ML3a passes inward from the open end of the second aperture 1251 of the second light-shielding portion 125, which prevents the second aperture 1251 from cutting (blocking) the unnecessary light included on the right side of the light ray ML3a, however, it is possible for the light ray ML3a to be cut at the open end of the third aperture 1261 of the third light-shielding portion 126.

According to the light-guiding optical system 112 of the second embodiment as such, it is possible, by providing the first light-shielding portion 124, the second light-shielding portion 125, and the third light-shielding portion 126 that are formed at the three optical surfaces (the incidence surface 22a, the emission surface 22c, and the inner reflective surface 22b) of the prism 22, to cut the unnecessary light incident on the pupil position PP without using a diaphragm member. Thus, according to the display module 201 of the second embodiment, the light-guiding optical system 112 is included, thus it is possible to enable the user US to view high-quality images.

Figure 11:
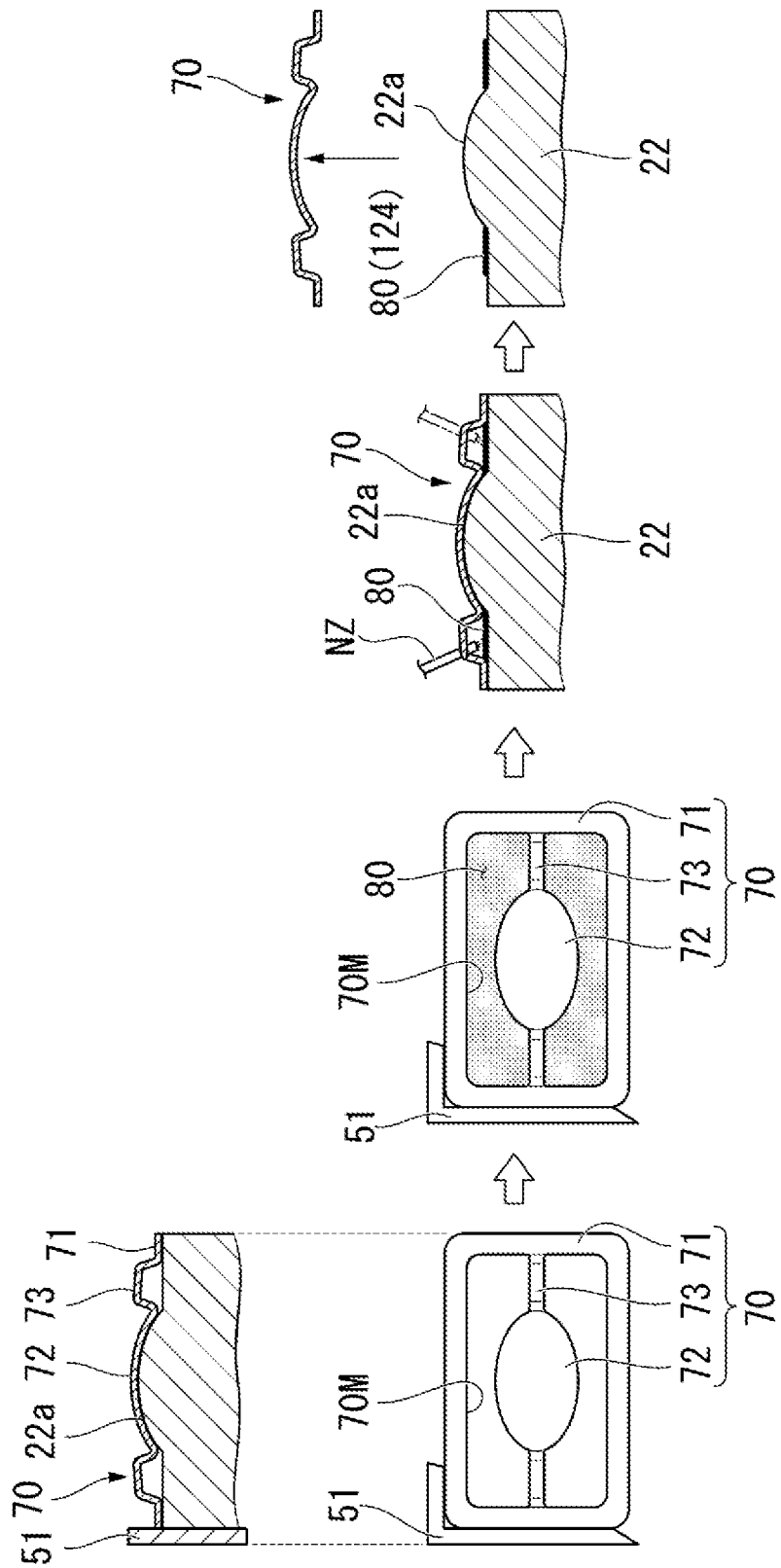
FIG. 11 is a step diagram illustrating an example of a manufacturing method for a light-guiding optical system of the second embodiment.

Next, a manufacturing method for the light-guiding optical system 112 of the second embodiment will be described. FIG. 11 is a step diagram illustrating an example of a manufacturing method for the light-guiding optical system 112.

In the following, a step for forming the first light-shielding portion (light-shielding portion) 124 at the incidence surface (optical surface) 22a of the prism (optical member) 22 will be described, as an example. The manufacturing method for the light-guiding optical system 112 of the second embodiment includes a covering step, a light-shielding step, and a removal step.

The covering step is a step in which a cover member is disposed on the incidence surface 22a of the prism 22 to cover a part of the incidence surface 22a. As illustrated in FIG. 11, a cover member 70 used in this step includes a frame-shaped base portion 71, a cover portion 72 located on the inner side of the base portion 71 and covering the incidence surface 22a, and a coupling portion 73 that couples the base portion 71 with the cover portion 72 in a state where a gap is created with respect to the incidence surface 22a.

The light-shielding step is a step for forming the first light-shielding portion 124 in a predetermined area of the incidence surface 22a of the prism 22. In this step, the cover member 70 is positioned on the incidence surface 22a using the case 51 supporting the prism 22, and then a light-shielding material 80 is applied onto a predetermined area, in the incidence surface 22a, that is not covered by the cover member 70 to form the first light-shielding portion 124.

In the cover member 70, an aperture portion 70M having a shape corresponding to the first aperture 241 is formed between the base portion 71 and the cover portion 72. The cover member 70 is abutted against the case 51 to be positioned at a predetermined position with respect to the prism 22. That is, in the cover member 70, the aperture portion 70M is positioned in the effective area of the incidence surface 22a (the area where the first light-shielding portion 124 is formed). Accordingly, the predetermined area, in the incidence surface 22a, that is not covered by the cover member 70 corresponds to an area exposed through the aperture portion 70M.

In this step, the light-shielding material 80 is applied onto the incidence surface 22a exposed through the aperture portion 70M to form the first light-shielding portion 124. When the light-shielding material 80 is applied with application equipment from the upper side into the aperture portion 70M, it is hard for the light-shielding material 80 to be applied well to the lower side of the coupling portion 73, for example.

In the case of the second embodiment, the coupling portion 73 has a shape that upwardly diverts the incidence surface 22a, where a gap is provided between the coupling portion 73 and the incidence surface 22a. This makes it possible, by individually inserting an application nozzle NZ downward of the coupling portion 73, to apply the light-shielding material 80 onto the incidence surface 22a located downward of the coupling portion 73, for example. This causes the light-shielding material 80 to be applied onto the whole area of the aperture portion 70M, and to form the first light-shielding portion 124 on the incidence surface 22a.

In the removal step, the cover member 70 is removed from the prism 22 forming the first light-shielding portion 124. According to this step, the prism 22 in which the first light-shielding portion 124 is formed on the incidence surface 22a is manufactured. Note that the light-shielding material 80 (the first light-shielding portion 124) is not formed at a portion, in the incidence surface 22a, that is covered by the base portion 71 of the cover member 70. Note that the portion covered by the base portion 71 is normally covered by a parts attached to the case 51, which makes it needless to apply the light-shielding material 80 thereto, however, the light-shielding material 80 may be applied thereto where necessary.

As such, it is possible for the first light-shielding portion 124 to be formed at the incidence surface 22a of the prism 22. Note that the same steps as in the first light-shielding portion 124 described above are carried out to form the second light-shielding portion 125 and the third light-shielding portion 126 at the emission surface 22c and the inner reflective surface 22b of the prism 22, respectively.

The first light-shielding portion 124, the second light-shielding portion 125, and the third light-shielding portion 126 are formed in the prism 22, then the projection lens 21 is housed inside the case 51 and the see-through mirror 23 is attached, via the support plate 54, to the case 51, which makes it possible to manufacture the light-guiding optical system 112.

Modification Examples and Other Matters

The present disclosure has been described as the above based on the above-described embodiments, and the present disclosure is not limited to the above-described embodiments. The present disclosure may be carried out in various modes without departing from the gist of the present disclosure, and is also applicable to the following modifications, for example.

In the second embodiment described above, an example is given of a case in which the light-shielding portion (corresponding to the first light-shielding portion) is formed at either one of the projection lens 21 or the prism 22, however, a first light-shielding portion (corresponding to the first light-shielding portion) is formed at either one of the incidence surface 21a or the emission surface 21b of the projection lens 21, and a second light-shielding portion (corresponding to the second light-shielding portion) may be formed at any one of the incidence surface 22a, the inner reflective surface 22b, or the emission surface 22c of the prism 22, for example.

Figure 12:
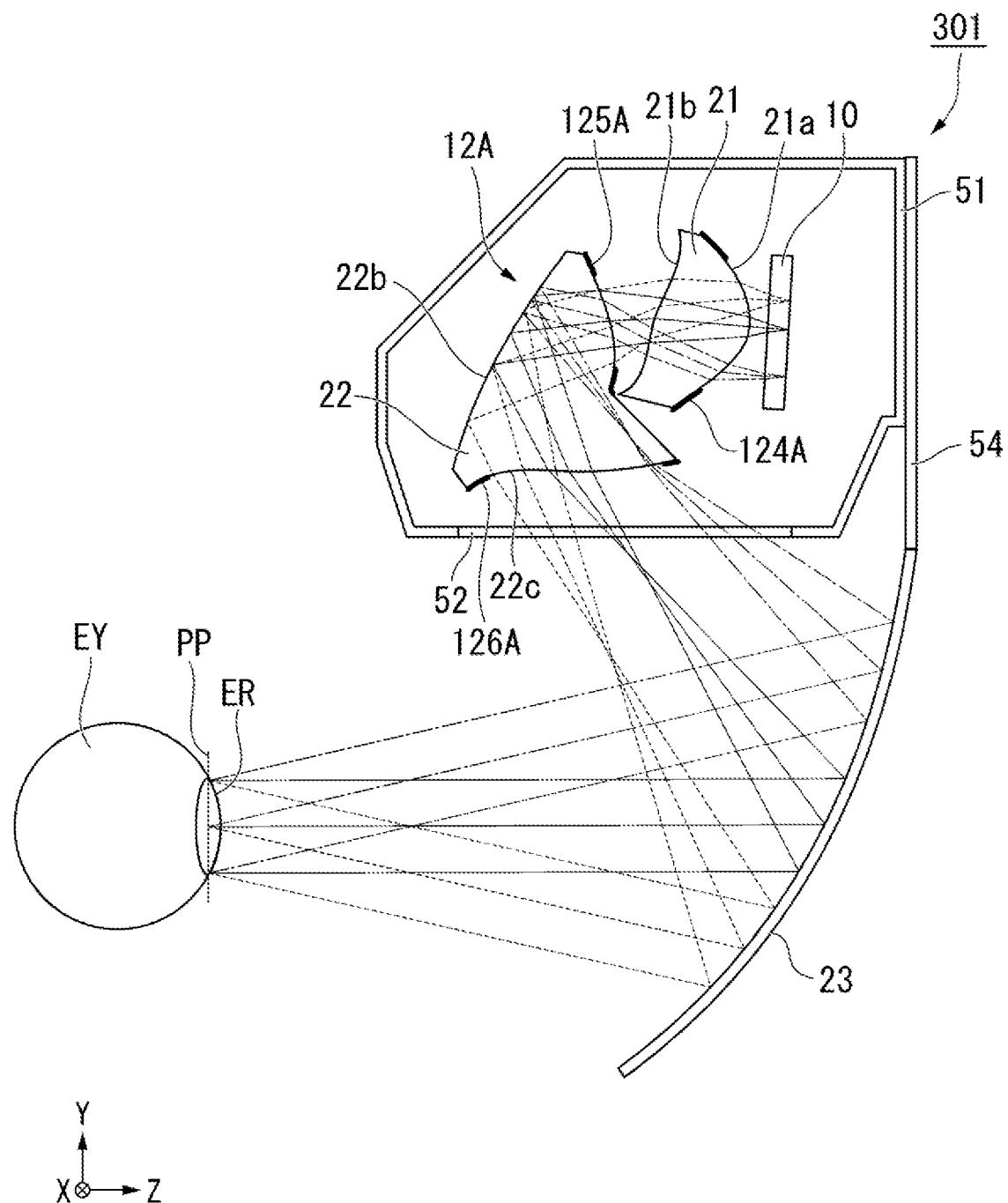
FIG. 12 is a diagram illustrating a configuration of a light-guiding optical system according to the first modification example.

FIG. 12 is a diagram illustrating a configuration of a light-guiding optical system 12A according to the first modification example.

As illustrated in FIG. 12, the light-guiding optical system 12A of a display module 301 of the modification example includes a first light-shielding portion 124A formed at the incidence surface 21a of the projection lens 21, a second light-shielding portion 125A formed at the incidence surface 22a of the prism 22, and a third light-shielding portion 126A formed at the emission surface 22c of the prism 22. In this case, the emission surface 21b of the projection lens 21 corresponds to the "third optical surface" recited in the claims, and the inner reflective surface 22b of the prism 22 corresponds to the "fourth optical surface" recited in the claims.

Note that the first light-shielding portion 124A may be formed at the emission surface 21b of the projection lens 21, and the second light-shielding portion 125A or the third light-shielding portion 126A may be formed at the inner reflective surface 22b of the prism 22.

Also, in the above-described embodiments, the incidence surface 21a and the emission surface 21b of the projection lens 21, or the incidence surface 22a, the inner reflective surface 22b, and the emission surface 22c of the prism 22 are exemplified as the optical surface forming the light-shielding portion, and a surface 52a of the protective cover 52 that functions as a dust-proof member may also be used as the optical surface forming the light-shielding portion.

Figure 13:
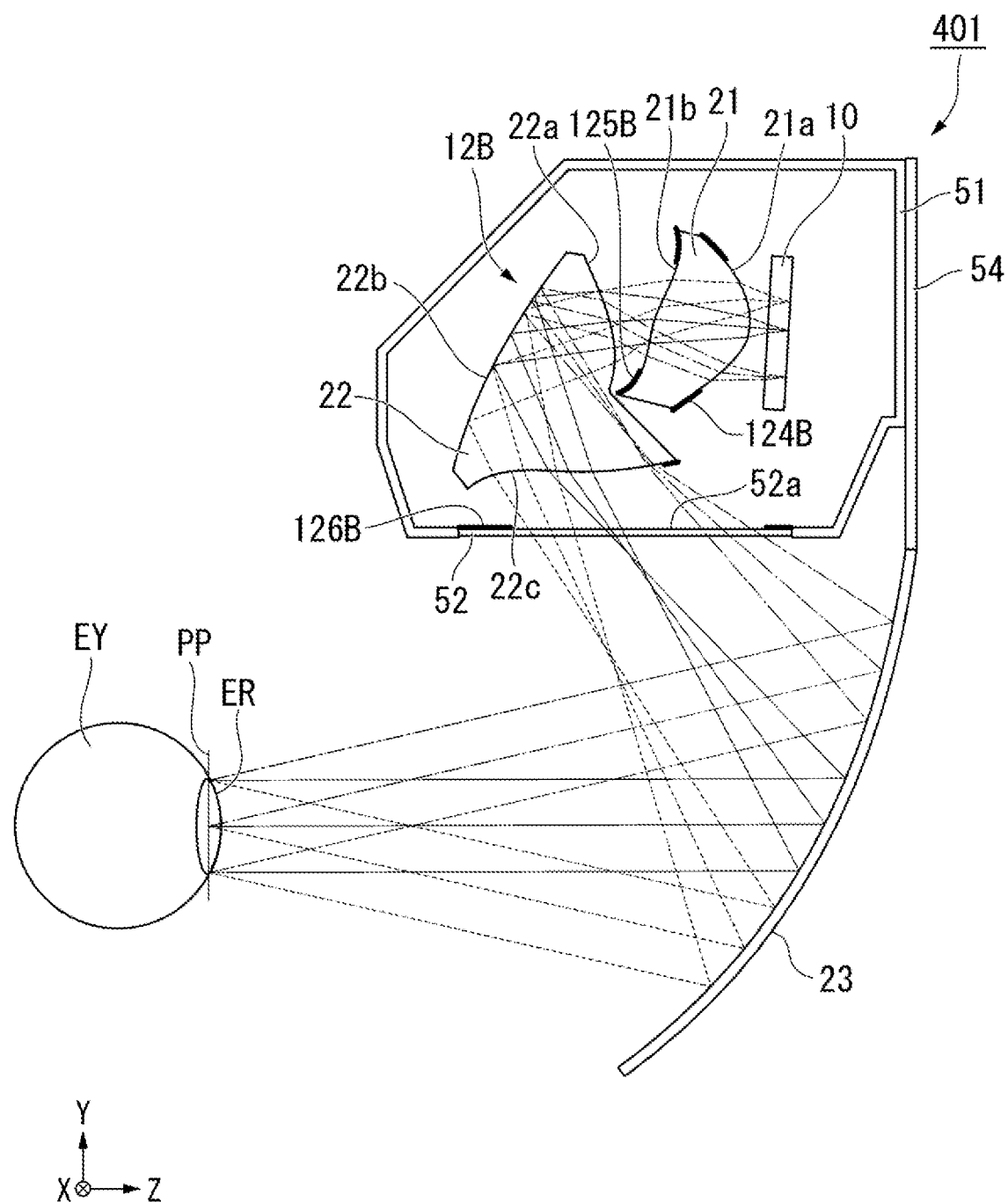
FIG. 13 is a diagram illustrating a configuration of a light-guiding optical system according to the second modification example.

FIG. 13 is a diagram illustrating a configuration of a light-guiding optical system 12B according to the second modification example.

As illustrated in FIG. 13, in the light-guiding optical system 12B of a display module 401 of the second modification example, there are included a first light-shielding portion 124B formed at the incidence surface 21a of the projection lens 21, a second light-shielding portion 125B formed at the emission surface 21b of the projection lens 21, and a third light-shielding portion 126B formed at the surface 52a of the protective cover 52. In this case, the surface 52a of the protective cover 52 corresponds to the "third optical surface" recited in the claims.

In addition, a step for forming one light-shielding portion at each of the projection lens 21, the prism 22, and the protective cover 52 may be employed.

Further, in the above-described embodiments, the self-luminous display device such as an organic EL element, an LCD, and the other light modulation element are used as the display element 10, which does not limit the present disclosure. It is also possible, in place of the display element 10, to apply an image forming apparatus in which a plurality of display elements are combined with a synthetic prism that synthesizes the image light from the plurality of display elements, and an image forming apparatus in which a laser scanner is used in which a laser light source is combined with a scanner such as a polygon mirror, for example.

Note that a light control device that controls light by restricting transmissive light through the see-through mirror 23 may be attached to the external world side of the see-through mirror 23. The light control device electrically adjusts transmittance, for example. A mirror liquid crystal, an electronic shade, and the like may be used as the light control device. The light control device may adjust transmittance in accordance with external light brightness. It is possible, when the light control device blocks the external light OL, to observe only a virtual image that is not affected by an external image. Also, the virtual image display apparatus of the claimed disclosure is applicable to a so-called closed-type head-mounted display apparatus (HMD) that blocks external light and causes only image light to be visually recognized. In this case, the HMD may also be compatible with a so-called see-through video product constituted by a virtual image display apparatus and an image capturing device.

Also, in the description above, the virtual image display apparatus 100 is premised to be mounted and used on a head, and the virtual image display apparatus 100 described above may also be used as a hand-held display that is not mounted on the head and is viewed into the display like binoculars. That is, the head-mounted display also includes a hand-held display in the present disclosure.

The display module of one aspect of the present disclosure may have the following configuration.

According to one aspect of the present disclosure, there is provided a display module including a display element, and a light-guiding optical device that guides image light emitted from the display element to form an exit pupil, in which the light-guiding optical device is an off-axis optical system, the off-axis optical system including a first optical surface, a second optical surface, a first light-shielding portion, the first light-shielding portion being formed at the first optical surface, and a second light-shielding portion, the second light-shielding portion being formed at the second optical surface, in which the first light-shielding portion exposes, through a first aperture, a part of the first optical surface, and the second light-shielding portion exposes, through a second aperture, a part of the second optical surface, the first aperture and the second aperture having mutually different shapes.

In the display module according to one aspect of the present disclosure, the light-guiding optical device may include a first optical member, the first optical member including the first optical surface and the second optical surface.

In the display module according to one aspect of the present disclosure, the first optical member may be any one of a projection lens, a prism, or a dust-proof member, and the first optical surface and the second optical surface may be any one of an incidence surface, a reflective surface, or an emission surface.

In the display module according to one aspect of the present disclosure, the first optical member may further include a third optical surface, and the light-guiding optical device may include a third light-shielding portion, the third light-shielding portion being formed at the third optical surface.

In the display module according to one aspect of the present disclosure, the light-guiding optical device may include a first optical member, the first optical member including the first optical surface and the third optical surface, and a second optical member, the second optical member including the second optical surface and the fourth optical surface.

In the display module according to one aspect of the present disclosure, the first optical member and the second optical member may be any one of a projection lens, a prism, or a dust-proof member, and the first optical surface, the second optical surface, the third optical surface, and the fourth optical surface may be any one of an incidence surface, a reflective surface, or an emission surface.

In the display module according to one aspect of the present disclosure, the light-guiding optical device may include a third light-shielding portion, the third light-shielding portion being formed at at least one of the third optical surface or the fourth optical surface.

In the display module according to one aspect of the present disclosure, the first aperture and the second aperture may be within an off-axis surface of the off-axis optical system, the first aperture and the second aperture having an asymmetrical aperture shape in a direction orthogonal to an optical axis of the light-guiding optical device.

The virtual image display apparatus of one aspect of the present disclosure may have the following configuration.

The virtual image display apparatus of one aspect of the present disclosure includes an image display module of the aspect described above.

A manufacturing method for a light-guiding optical device of one aspect of the present disclosure may have the following configuration.

A manufacturing method for a light-guiding optical device of one aspect of the present disclosure is a manufacturing method for a light-guiding optical device that guides image light emitted from a display element to form an exit pupil, the method including a first forming step for forming a protective layer at a part on an optical surface of an optical member, a second forming step for forming a light-shielding portion at an area, in the optical surface of the optical member, where the protective layer is not formed, and a peeling-off step for peeling off the protective layer from the optical member where the light-shielding portion is formed, in which the first forming step includes positioning a mask on the optical surface using a support member supporting the optical member, and then applying a protective-layer formation material onto the mask, and removing, after application of the protective-layer formation material, the mask from the optical surface to form the protective layer at a position corresponding to an aperture portion of the mask.

In the manufacturing method for the light-guiding optical device of one aspect of the present disclosure, the second forming step may include forming a concave-convex shaped portion formed at an area, in the optical surface, that is not covered by the protective layer, and forming a light-shielding coating film at the concave-convex shaped portion.

A manufacturing method for the light-guiding optical device of another aspect of the present disclosure may have the following configuration.

According to one aspect of the present disclosure, there is provided a manufacturing method for a light-guiding optical device that guides image light emitted from a display element to form an exit pupil, the method including a covering step for disposing a cover member onto an optical surface of an optical member to cover a part of the optical surface, a light-shielding step for forming a light-shielding portion in a predetermined area, in the optical surface of the optical member, that is not covered by the cover member, and a removal step for removing the cover member from the optical member where the light-shielding portion is formed, in which the covering step includes using, as the cover member, a member including a frame-shaped base portion, a cover portion located inside the base portion, the cover portion covering the optical surface, and a coupling portion coupling the base portion with the cover portion, in a state where a gap is created with respect to the optical surface, and the light-shielding step includes positioning the cover member on the optical surface using a support member supporting the optical member, and then applying a light-shielding material onto the predetermined area, of the cover member, that is not covered by the base portion and the cover portion to form the light-shielding portion.

What is claimed is:

1. A display module comprising:
  a display element that emits an image light; and
  a light-guiding optical device that includes:
    a first optical surface in which the image light from the display element is incident,
    a second optical surface emitting the image light,
    a first light-shielding portion provided along the first optical surface and including a first aperture, and
    a second light-shielding portion provided along the second optical surface and including a second aperture,
  wherein
  a shape of the first aperture is different from a shape of the second aperture,
  shapes of the first aperture and the second aperture, within an off-axis surface of the light-guiding optical device, are asymmetric in a direction orthogonal to an optical axis of the light-guiding optical device, and are symmetric in another direction orthogonal to the optical axis of the light-guiding optical device.

2. The display module according to claim 1, wherein the light-guiding optical device includes a first optical member including the first optical surface and the second optical surface.

3. The display module according to claim 2, wherein the first optical member is any one of a projection lens, a prism, or a dust-proof member.

4. The display module according to claim 2, wherein the first optical member further includes a third optical surface, and
the light-guiding optical device includes a third light-shielding portion formed at the third optical surface.

5. The display module according to claim 1, wherein the light-guiding optical device includes a first optical member including the first optical surface and a third optical surface, and
a second optical member including the second optical surface and a fourth optical surface.

6. The display module according to claim 5, wherein the first optical member and the second optical member are any one of a projection lens, a prism, or a dust-proof member, and
the first optical surface, the second optical surface, the third optical surface, and the fourth optical surface are any one of an incidence surface, a reflective surface, or an emission surface.

7. The display module according to claim 5, wherein the light-guiding optical device includes a third light-shielding portion formed at at least one of the third optical surface or the fourth optical surface.

8. A virtual image display apparatus, comprising the display module according to claim 1.

9. A manufacturing method for a light-guiding optical device that guides image light emitted from a display element to form an exit pupil,
the method comprising:
  a first forming step for forming a protective layer at a part on an optical surface of an optical member;
  a second forming step for forming a light-shielding portion at an area, in the optical surface of the optical member, where the protective layer is not formed, and
  a peeling-off step for peeling off the protective layer from the optical member where the light-shielding portion is formed, wherein
  the first forming step includes
  positioning a mask on the optical surface using a support member supporting the optical member, and then applying a protective-layer formation material onto the mask, and
  removing, after application of the protective-layer formation material, the mask from the optical surface to form the protective layer at a position corresponding to an aperture portion of the mask.

10. The manufacturing method for the light-guiding optical device according to claim 9, wherein the second forming step includes
forming a concave-convex shaped portion at an area, in the optical surface, that is not covered by the protective layer, and
forming a light-shielding coating film at the concave-convex shaped portion.

11. A manufacturing method for a light-guiding optical device that guides image light emitted from a display element to form an exit pupil,
the method comprising:
a covering step for disposing a cover member onto an optical surface of an optical member to cover a part of the optical surface;
a light-shielding step for forming a light-shielding portion in a predetermined area, in the optical surface of the optical member, that is not covered by the cover member, and
a removal step for removing the cover member from the optical member where the light-shielding portion is formed, wherein
the covering step includes
using, as the cover member, a member including a frame-shaped base portion, a cover portion located inside the base portion, the cover portion covering the optical surface, and a coupling portion coupling the base portion with the cover portion, in a state where a gap is created with respect to the optical surface, and
the light-shielding step includes
positioning the cover member on the optical surface using a support member supporting the optical member, and then applying a light-shielding material onto the predetermined area, of the cover member, that is not covered by the base portion and the cover portion to form the light-shielding portion.

* * * * *